United States Patent
Bruce et al.

(10) Patent No.: US 12,352,213 B2
(45) Date of Patent: Jul. 8, 2025

(54) ELECTRICAL SYSTEMS WITH DUAL-WOUND ROTARY ELECTRIC MACHINES

(71) Applicant: ROLLS-ROYCE plc, London (GB)

(72) Inventors: Graham P Bruce, Derby (GB);
Stephen M Husband, Derby (GB);
David F Brookes, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 18/158,683

(22) Filed: Jan. 24, 2023

(65) Prior Publication Data

US 2023/0160344 A1 May 25, 2023

Related U.S. Application Data

(63) Continuation of application No. 17/002,044, filed on Aug. 25, 2020, now abandoned.

(30) Foreign Application Priority Data

Sep. 10, 2019 (GB) .................................. 1913016

(51) Int. Cl.
*F01D 15/10* (2006.01)
*F02C 3/113* (2006.01)
(Continued)

(52) U.S. Cl.
CPC ............... *F02C 7/275* (2013.01); *F01D 15/10* (2013.01); *F02C 3/113* (2013.01); *F02C 7/32* (2013.01); *H02K 7/1823* (2013.01)

(58) Field of Classification Search
None
See application file for complete search history.

(56) References Cited

U.S. PATENT DOCUMENTS 5,578,880 A 11/1996 Lyons et al.
8,994,206 B2 3/2015 Bala et al.
(Continued)

FOREIGN PATENT DOCUMENTS

EP 2 579 430 A2 4/2013
EP 2 617 998 A2 7/2013
(Continued)

OTHER PUBLICATIONS

Feb. 15, 2021 Extended Search Report issued in European Patent Application No. 20190181.6.

*Primary Examiner* — Gerald L Sung
*Assistant Examiner* — Jacek Lisowski
(74) *Attorney, Agent, or Firm* — Oliff PLC (57) ABSTRACT

An electrical system having a first dual-wound rotary electric machine mechanically coupled with a first gas turbine spool and having a first three-phase sub-machine and a second three-phase submachine; a second dual-wound rotary electric machine mechanically coupled with a second gas turbine spool and having a third three-phase sub-machine and a fourth three-phase submachine; and a set of N=4 bidirectional converter circuits for conversion of alternating current (ac) to and from direct current (dc), each of which has an associated index n=(1, ..., N), and for all n, the ac side of the nth bidirectional converter circuit is connected with the nth three-phase sub-machine. The dc side of the first converter circuit is connected with the dc side of the third converter circuit, and the dc side of the second converter circuit is connected with the dc side of the fourth converter circuit.

15 Claims, 6 Drawing Sheets

(51) Int. Cl.
    *F02C 7/275*     (2006.01)
    *F02C 7/32*     (2006.01)
    *H02K 7/18*     (2006.01)

(56) References Cited

U.S. PATENT DOCUMENTS

| | | | |
|---|---|---|---|
| 9,899,868 B2* | 2/2018 | Bundschuh | H02J 3/32 |
| 2005/0056021 A1 | 3/2005 | Belokon et al. | |
| 2007/0024147 A1* | 2/2007 | Hirzel | H02P 25/16 |
| | | | 310/191 |
| 2007/0259545 A1 | 11/2007 | Berenger | |
| 2011/0285202 A1 | 11/2011 | Rozman et al. | |
| 2013/0088017 A1* | 4/2013 | Jia | H02K 3/28 |
| | | | 310/210 |
| 2013/0200714 A1 | 8/2013 | Pan et al. | |
| 2015/0061378 A1 | 3/2015 | Nakagawa et al. | |
| 2015/0123463 A1 | 5/2015 | Huang et al. | |
| 2017/0207738 A1* | 7/2017 | Meyer | B60L 58/20 |
| 2017/0226933 A1 | 8/2017 | Klonowski et al. | |
| 2018/0216526 A1* | 8/2018 | Dalal | F02C 7/32 |
| 2019/0002116 A1* | 1/2019 | Gansler | F02C 6/14 |
| 2019/0085715 A1* | 3/2019 | van der Merwe | F02C 3/067 |
| 2019/0257211 A1 | 8/2019 | Huang et al. | |
| 2022/0009643 A1* | 1/2022 | Datta | B64D 27/24 |

FOREIGN PATENT DOCUMENTS

| | | |
|---|---|---|
| EP | 3 254 962 A1 | 12/2017 |
| WO | 2007/031758 A2 | 3/2007 |

\* cited by examiner

ELECTRICAL SYSTEMS WITH DUAL-WOUND ROTARY ELECTRIC MACHINES

CROSS-REFERENCE TO RELATED APPLICATIONS

This application is a continuation application of U.S. patent application Ser. No. 17/002,044 filed Aug. 25, 2020 and claims the benefit thereto. The application is based upon and claims the benefit of priority from UK Patent Application Number 1913016.0 filed on 10 Sep. 2019. The entire contents of each of the above applications are incorporated herein by reference.

TECHNICAL FIELD

This disclosure concerns electrical systems for connecting rotary electric machines with rotating machinery such as gas turbine spools.

BACKGROUND

In aerospace, the more electric engine (MEE) and more electric aircraft (MEA) concepts have been advocated for the substantial reduction in fuel consumption and complexity they bring. For example, one known aircraft configuration includes in its engines electric machines operable as both motors and generators so as to facilitate both generation of electrical power during flight but also starting of the engine and removal of the air-turbine starter. One engine configuration for this known aircraft includes such electric machines coupled to the high-pressure spool of a twin-spool turbofan. Another includes such electric machines coupled to the intermediate-pressure spool of a triple-spool turbofan.

Service experience has shown however that the means of electrical generation in such configurations can and do fail from time to time. In addition, the electrical aspects of the devices are considered complex systems and so a rate approach to certification is not possible. This imposes a requirement for fault-tolerant designs. It is accepted practice to provide single fault-tolerance, on the basis that the mean time before failure for the surviving system is sufficiently long.

Increasingly, it is seen as desirable to facilitate power transfer between spools of a gas turbine engine. Studies have shown that improvements in component life and specific fuel consumption are possible, which can be substantial on short-haul missions. Other studies have shown that augmentation of the core gas turbine using the electrical system allows reduction in the size of the turbomachinery.

Clearly, however, if the extreme position is taken to the extent that the safe flight of the vehicle relies on such an electrical power augmentation system, said system must have the requisite fault-tolerance to facilitate continued operation in the presence of a fault. Such a requirement may be summarised by saying that the engine is dispatchable in the presence of a single fault, i.e. even with a single fault having occurred, the electrical system may still tolerate another fault which will not cause a hazardous or catastrophic event.

Alongside developments in turbofans for airliners, vehicles such as electric vertical take-off and landing (EV-TOL) aircraft are being developed which require a similar approach to guarantee operational safety. Near term proposals are configured with redundant turboelectric generators for powering electric propellers. For the purposes of weight management, the turboelectric generators are likely to be single-spool gas turbines. In a similar way to multi-spool turbofan engines benefiting from shaft power transfer, it is beneficial in such installations to facilitate fault-tolerant transfer of power between the turboelectric generators, for example to allow in-flight relight.

Thus, it is an object of the invention to provide an electrical system for connecting rotary electric machines to gas turbine spools. It will be appreciated in view of the foregoing discussion that the gas turbine spools may form part of the same engine, or different engines.

SUMMARY

The invention is directed towards electrical systems for connecting rotary electric machines with rotating machinery, which rotating machinery may comprise, for example, gas turbine spools. Thus, the invention is also directed towards a gas turbine comprising such electrical systems, and arrangements comprising two gas turbines and such electrical systems.

In an aspect, the electrical systems comprise:
  a first dual-wound rotary electric machine mechanically coupled with a first gas turbine spool and comprising a first three-phase sub-machine and a second three-phase submachine;
  a second dual-wound rotary electric machine mechanically coupled with a second gas turbine spool and comprising a third three-phase sub-machine and a fourth three-phase submachine;
  a set of N=4 bidirectional converter circuits for conversion of alternating current (ac) to and from direct current (dc), each of which has an associated index n=(1, . . . , N), and for all n, the ac side of the nth bidirectional converter circuit is connected with the nth three-phase sub-machine; and
  the dc side of the first converter circuit is connected with the dc side of the third converter circuit, and the dc side of the second converter circuit is connected with the dc side of the fourth converter circuit.

In an embodiment:
  the dc side of the first converter circuit and the dc side of the third bidirectional converter circuit are connected to a first dc output bus; and
  the dc side of the second converter circuit and the dc side of the fourth bidirectional converter circuit are connected to a second dc output bus.

In an embodiment the connection to the first dc output bus is via a first switch array, and the connection to the second dc output bus is via a second switch array.

In an embodiment the first switch array and the second switch array each comprise:
  a first input connected with one of the converter circuits;
  a second input connected with another one of the converter circuits;
  an output connected with one of the dc output busses;
  a first switch between the first input and the output;
  a second switch between the second input and the output;
  a bus tie across the first input and the second input, the bus tie comprising a third switch.

In an embodiment the first switch array and the second switch array are configured to operate in a no-fault condition in which the first switch and the second switch are closed, and the third switch is opened.

In an embodiment the first switch array and the second switch array are configured to operate in a first fault condition in which the second switch is closed, and the first switch and the third switch are opened.

In an embodiment the electrical system further comprises a control circuit configured to:
operate the first switch array in the first fault condition in response to identification of a fault between the first three-phase submachine and the first converter circuit; and
operate the second switch array in the first fault condition in response to identification of a fault between the second three-phase submachine and the second converter circuit.

In an embodiment the first switch array and the second switch array are configured to operate in a second fault condition in which the first switch is closed, and the second switch and the third switch are opened.

In an embodiment the electrical system further comprises a control circuit configured to:
operate the first switch array in the second fault condition in response to identification of a fault between the third three-phase submachine and the third converter circuit; and
operate the second switch array in the second fault condition in response to identification of a fault between the fourth three-phase submachine and the fourth converter circuit.

In an embodiment the first switch array and the second switch array are configured to operate in a third fault condition in which the third switch is closed, and the first switch and the second switch are opened.

In an embodiment the electrical system further comprises a control circuit configured to:
operate the first switch array in the third fault condition in response to identification of a fault between the output of the first switch array and the first dc output bus; and
operate the second switch array in the third fault condition in response to identification of a fault between the output of the second switch array and the second dc output bus.

In an embodiment the switches are dc contactors.

In another aspect, there is provided a gas turbine engine having a low-pressure spool and a high-pressure spool, and further comprising the electrical system of the aforesaid type, in which the first gas turbine spool is the low-pressure spool and the second gas turbine spool is the high-pressure spool.

In another aspect, there is provided an arrangement comprising:
a first gas turbine engine having a first spool;
a second gas turbine engine different from the first gas turbine engine, and having a second spool; and
the electrical system of the aforesaid type, in which the first gas turbine spool is the first spool of the first gas turbine engine, and the second gas turbine spool is the second spool of the second gas turbine engine.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
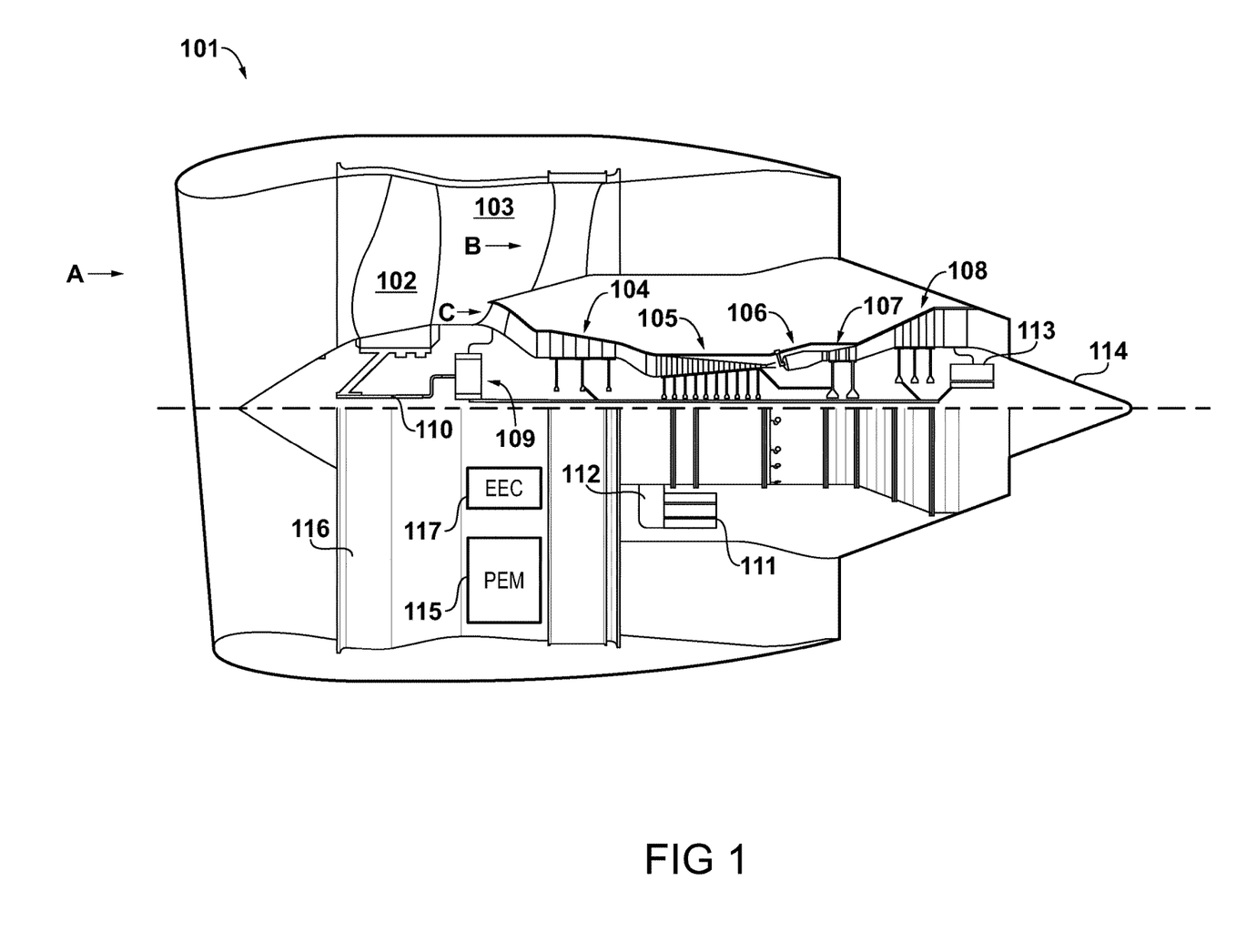
FIG. 1 shows a general arrangement of a turbofan engine for an aircraft, including a rotary electric machine on each spool thereof.

FIG. 1

A general arrangement of an engine 101 for an aircraft is shown in FIG. 1. In the present embodiment, the engine 101 is of turbofan configuration, and thus comprises a ducted fan 102 that receives intake air A and generates two pressurised airflows: a bypass flow B which passes axially through a bypass duct 103 and a core flow C which enters a core gas turbine.

The core gas turbine comprises, in axial flow series, a low-pressure compressor 104, a high-pressure compressor 105, a combustor 106, a high-pressure turbine 107, and a low-pressure turbine 108.

In operation, the core flow C is compressed by the low-pressure compressor 104 and is then directed into the high-pressure compressor 105 where further compression takes place. The compressed air exhausted from the high-pressure compressor 105 is directed into the combustor 106 where it is mixed with fuel and the mixture is combusted. The resultant hot combustion products then expand through, and thereby drive, the high-pressure turbine 107 and in turn the low-pressure turbine 108 before being exhausted to provide a small proportion of the overall thrust.

The high-pressure turbine 107 drives the high-pressure compressor 105 via an interconnecting shaft. The low-pressure turbine 108 drives the low-pressure compressor 104 via another interconnecting shaft. Together, the high-pressure compressor 105, high-pressure turbine 107, and associated interconnecting shaft form part of a high-pressure spool of the engine 101. Similarly, the low-pressure compressor 104, low-pressure turbine 108, and associated interconnecting shaft form part of a low-pressure spool of the engine 101. Such nomenclature will be familiar to those skilled in the art.

The fan 102 is driven by the low-pressure turbine 108 via a reduction gearbox in the form of a planetary-configuration epicyclic gearbox 109. Thus in this configuration, the low-pressure turbine 108 is connected with a sun gear of the gearbox 109. The sun gear is meshed with a plurality of planet gears located in a rotating carrier, which planet gears are in turn are meshed with a static ring gear. The rotating carrier drives the fan 102 via a fan shaft 110.

It will be appreciated that in alternative embodiments a star-configuration epicyclic gearbox (in which the planet carrier is static and the ring gear rotates and provides the output) may be used instead.

In order to facilitate electrical generation by the engine 101, a first rotary electric machine 111 capable of operating both as a motor and generator is mechanically coupled with the high-pressure spool. In the present embodiment, the first electric machine 111 is coupled to the high-pressure spool via a high-pressure spool driven, core-mounted accessory gearbox 112 of conventional drive configuration. Thus, as well as operation as a generator to supply an aircraft on which the engine 101 is installed with electrical power, the first electric machine 111 may drive the high-pressure spool to facilitate starting of the engine 101 in place of an air turbine starter, and may also drive it in certain flight phases to improve operability, fuel consumption, etc.

In alternative embodiments, the first electric machine 111 may be mounted coaxially with the turbomachinery in the engine 101. For example, the first electric machine 111 may be mounted axially in line with the duct between the low- and high-pressure compressors 104 and 105.

Similarly, a second rotary electric machine 113 capable of operating both as a motor and generator is mechanically coupled with the low-pressure spool. In the present embodiment, the second electric machine 113 is mounted in the tail cone 114 of the engine 101 coaxially with the turbomachinery and is coupled to the low-pressure turbine 108. In alternative embodiments, the second rotary electric machine 113 may be located axially in line with low-pressure compressor 104, which may adopt a bladed disc or bladed drum configuration to provide space for the second rotary electric machine 113.

It will of course be appreciated by those skilled in the art that any other suitable location for the first and second electric machines may be adopted.

In the present embodiment, the first and second electric machines are connected with power electronics. Extraction of power from, or application of power to the electric machines is performed by a power electronics module (PEM) 115. In the present embodiment, the PEM 115 is mounted on the fan case 116 of the engine 101, but it will be appreciated that it may be mounted elsewhere such as on the core gas turbine, or in the vehicle to which the engine 101 is attached, for example.

Control of the PEM 115 and of the first and second electric machines 111 and 113 is in the present example performed by an engine electronic controller (EEC) 117. In the present embodiment the EEC 117 is a full-authority digital engine controller (FADEC), the configuration of which will be known and understood by those skilled in the art. It therefore controls all aspects of the engine 101, i.e. both of the core gas turbine and the first and second electric machines 111 and 113. In this way, the EEC 117 may holistically respond to both thrust demand and electrical power demand.

The internal configuration of PEM 115 guarantees fault-tolerant transfer of electric power between the first electric machine 111 and second electric machine 113. In this way, the turbomachinery may be designed to exploit the attendant advantages conferred by transfer of power between the high-pressure spool and the low-pressure spool. For example, transfer of power from the low-pressure spool to the high-pressure spool during the approach phase reduces the effective thrust of the engine 101 whilst maintaining sufficient high-pressure spool rotational speed to safely initiate a go-around manoeuvre. Further, in engine 101, transfer of power from the high-pressure spool to the low-pressure spool during a deceleration manoeuvre reduces the risk of weak extinction, therefore enabling a more optimal combustor design.

In an implementation contemplated herein, the PEM 115 is configured such that it may output to or receive electrical power from two dc busses—a configuration contemplated for future more electric aircraft platforms. The configuration of this electrical system will be described with reference to FIG. 2.

Various embodiments of the engine 101 may include one or more of the following features.

It will be appreciated that instead of being a turbofan having a ducted fan arrangement, the engine 101 may instead be a turboprop comprising a propeller for producing thrust.

The low- and high-pressure compressors 104 and 105 may comprise any number of stages, for example multiple stages. Each stage may comprise a row of rotor blades and a row of stator vanes, which may be variable stator vanes (in that their angle of incidence may be variable). In addition to, or in place of, axial stages, the low- or high-pressure compressors 104 and 105 may comprise centrifugal compression stages.

The low- and high-pressure turbines 107 and 108 may also comprise any number of stages.

The fan 102 may have any desired number of fan blades, for example 16, 18, 20, or 22 fan blades.

Each fan blade may be defined as having a radial span extending from a root (or hub) at a radially inner gas-washed location, or 0 percent span position, to a tip at a 100 percent span position. The ratio of the radius of the fan blade at the hub to the radius of the fan blade at the tip—the hub-tip ratio—may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The hub-tip ratio may be in an inclusive range bounded by any two of the aforesaid values (i.e. the values may form upper or lower bounds). The hub-tip ratio may both be measured at the leading edge (or axially forwardmost) part of the blade. The hub-tip ratio refers, of course, to the gas-washed portion of the fan blade, i.e. the portion radially outside any platform.

The radius of the fan 102 may be measured between the engine centreline and the tip of a fan blade at its leading edge. The fan diameter may be greater than (or on the order of) any of: 2.5 metres, 2.6 metres, 2.7 metres, 2.8 metres, 2.9 metres, 3 metres, 3.1 metres, 3.2 metres, 3.3 metres, 3.4 metres, 3.5 metres, 3.6 metres, 3.7 metres, 3.8 metres or 3.9 metres. The fan diameter may be in an inclusive range bounded by any two of the aforesaid values (i.e. the values may form upper or lower bounds).

The rotational speed of the fan 102 may vary in use. Generally, the rotational speed is lower for fans with a higher diameter. Purely by way of non-limitative example, the rotational speed of the fan at cruise conditions may be less than 2500 rpm, for example 2300 rpm. Purely by way of further non-limitative example, the rotational speed of the fan 102 at cruise conditions for an engine having a fan diameter in the range of from 2.5 metres to 3 metres (for example 2.5 metres to 2.8 metres) may be in the range of from 1700 rpm to 2500 rpm, for example in the range of from 1800 rpm to 2300 rpm, or, for example in the range of from 1900 rpm to 2100 rpm. Purely by way of further non-limitative example, the rotational speed of the fan at cruise conditions for an engine having a fan diameter in the range of from 3.2 metres to 3.8 metres may be in the range of from 1200 rpm to 2000 rpm, for example in the range of from 1300 rpm to 1800 rpm, for example in the range of from 1400 rpm to 1600 rpm.

In use of the engine 101, the fan 102 (with its associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the one-dimensional average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4. The fan tip loading may be in an inclusive range bounded by any two of the values in the previous sentence (i.e. the values may form upper or lower bounds).

The engine 101 may have any desired bypass ratio, where the bypass ratio is defined as the ratio of the mass flow rate of the flow B through the bypass duct to the mass flow rate of the flow C through the core at cruise conditions. Depending upon the selected configuration, the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the aforesaid values (i.e. the values may form upper or lower bounds). The bypass duct may be substantially annular. The bypass duct may be radially outside the core engine 103. The radially outer surface of the bypass duct may be defined by a nacelle and/or a fan case.

The overall pressure ratio of the engine 101 may be defined as the ratio of the stagnation pressure upstream of the fan 102 to the stagnation pressure at the exit of the high-pressure compressor 105 (before entry into the combustor). By way of non-limitative example, the overall pressure ratio of the engine 101 at cruise may be greater than (or on the order of) any of the following: 35, 40, 45, 50, 55, 60, 65, 70, 75. The overall pressure ratio may be in an inclusive range bounded by any two of the aforesaid values (i.e. the values may form upper or lower bounds).

Specific thrust of the engine 101 may be defined as the net thrust of the engine divided by the total mass flow through the engine 101. At cruise conditions, the specific thrust of the engine 101 may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$, or 80 $Nkg^{-1}s$. The specific thrust may be in an inclusive range bounded by any two of the values in the previous sentence (i.e. the values may form upper or lower bounds). Such engines may be particularly efficient in comparison with conventional gas turbine engines.

The engine 101 may have any desired maximum thrust. For example, the engine 101 may be capable of producing a maximum thrust of at least (or on the order of) any of the following: 160 kilonewtons, 170 kilonewtons, 180 kilonewtons, 190 kilonewtons, 200 kilonewtons, 250 kilonewtons, 300 kilonewtons, 350 kilonewtons, 400 kilonewtons, 450 kilonewtons, 500 kilonewtons, or 550 kilonewtons. The maximum thrust may be in an inclusive range bounded by any two of the aforesaid values (i.e. the values may form upper or lower bounds). The thrust referred to above may be the maximum net thrust at standard atmospheric conditions at sea level plus 15 degrees Celsius (ambient pressure 101.3 kilopascals, temperature 30 degrees Celsius), with the engine 101 being static.

In use, the temperature of the flow at the entry to the high-pressure turbine 107 may be particularly high. This temperature, which may be referred to as turbine entry temperature or TET, may be measured at the exit to the combustor 106, for example immediately upstream of the first turbine vane, which itself may be referred to as a nozzle guide vane. At cruise, the TET may be at least (or on the order of) any of the following: 1400 kelvin, 1450 kelvin, 1500 kelvin, 1550 kelvin, 1600 kelvin or 1650 kelvin. The TET at cruise may be in an inclusive range bounded by any two of the aforesaid values (i.e. the values may form upper or lower bounds). The maximum TET in use of the engine 101 may be, for example, at least (or on the order of) any of the following: 1700 kelvin, 1750 kelvin, 1800 kelvin, 1850 kelvin, 1900 kelvin, 1950 kelvin or 2000 kelvin. The maximum TET may be in an inclusive range bounded by any two of the aforesaid values (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium-based metal or an aluminium based material (such as an aluminium-lithium alloy) or a steel-based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium-based body with a titanium leading edge.

The fan 102 may comprise a central hub portion, from which the fan blades may extend, for example in a radial direction. The fan blades may be attached to the central portion in any desired manner. For example, each fan blade may comprise a fixture which may engage a corresponding slot in the hub. Purely by way of example, such a fixture may be in the form of a dovetail that may slot into and/or engage a corresponding slot in the hub/disc in order to fix the fan blade to the hub. By way of further example, the fan blades maybe formed integrally with a central hub portion. Such an arrangement may be a bladed disc or a bladed ring. Any suitable method may be used to manufacture such a bladed disc or bladed ring. For example, at least a part of the fan blades may be machined from a billet and/or at least part of the fan blades may be attached to the hub/disc by welding, such as linear friction welding.

The engine 101 may be provided with a variable area nozzle (VAN). Such a variable area nozzle may allow the exit area of the bypass duct to be varied in use. The general principles of the present disclosure may apply to engines with or without a VAN.

As used herein, cruise conditions have the conventional meaning and would be readily understood by those skilled in the art.

Such cruise conditions may be conventionally defined as the conditions at mid-cruise, for example the conditions experienced by the aircraft and/or engine at the midpoint (in terms of time and/or distance) between top of climb and start of descent. Cruise conditions thus define an operating point of the gas turbine engine which provides a thrust that would ensure steady state operation (i.e. maintaining a constant altitude and constant Mach number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach number are known, and thus the operating point of the engine at cruise conditions is clearly defined.

The cruise conditions may correspond to ISA standard atmospheric conditions at an altitude that is in the range of from 10000 to 15000 metres, such as from 10000 to 12000 metres, or from 10400 to 11600 metres (around 38000 feet), or from 10500 to 11500 metres, or from 10600 to 11400 metres, or from 10700 metres (around 35000 feet) to 11300 metres, or from 10800 to 11200 metres, or from 10900 to 11100 metres, or 11000 metres. The cruise conditions may correspond to standard atmospheric conditions at any given altitude in these ranges.

The forward speed at the cruise condition may be any point in the range of from Mach 0.7 to 0.9, for example one of Mach 0.75 to 0.85, Mach 0.76 to 0.84, Mach 0.77 to 0.83, Mach 0.78 to 0.82, Mach 0.79 to 0.81, Mach 0.8, Mach 0.85, or in the range of from Mach 0.8 to 0.85. Any single speed within these ranges may be the cruise condition. For some aircraft, the cruise conditions may be outside these ranges, for example below Mach 0.7 or above Mach 0.9.

Thus, for example, the cruise conditions may correspond specifically to a pressure of 23 kilopascals, a temperature of minus 55 degrees Celsius, and a forward Mach number of 0.8.

It will of course be appreciated, however, that the principles of the invention claimed herein may still be applied to engines having suitable design features falling outside of the aforesaid parameter ranges.

Figure 2:
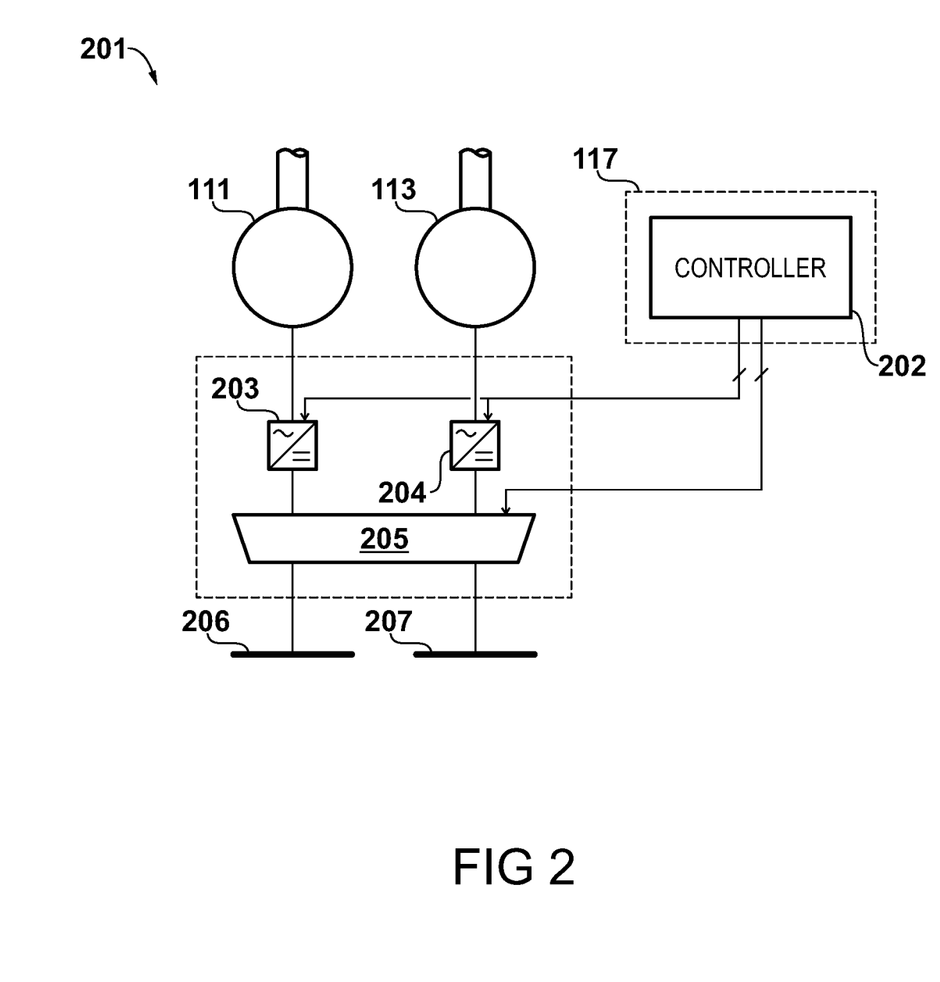
FIG. 2 shows an electrical system for connecting the electric machines of FIG. 1.

FIG. 2

An electrical system 201 for connecting the first and second electric machines 111 and 113 to the high- and low-pressure spools is shown in FIG. 2. The electrical system 201 is shown in the form of a single line diagram, the conventions of which will be familiar to those skilled in the art. Thus for alternating current (ac) a single line replaces a plurality of polyphase lines, and for direct current (dc) a single line replaces the +V and −V lines.

In the illustrated configuration, the ac output of the electric machines is provided to the PEM 115. The configuration of the electric machines will be described further with reference to FIG. 3.

A controller 202 for the PEM 115 is provided in the EEC 117. In the present example, the controller 202 is a functional module implemented in software running on the EEC 117. It will be appreciated that in alternative embodiments the controller 202 may be implemented in hardware in the EEC 117. It will also be appreciated that the controller 202 may be a separate module in addition to the EEC 117.

As shown in FIG. 2, a first set of bidirectional converter circuits 203 is connected with the first electric machine 111, and a second set of bidirectional converter circuits 204 is connected with the second electric machine 113.

The controller 202 is configured to control the operation of the first and second sets of bidirectional converter circuits 203 and 204 so as to control the operation of the electric machines 111 and 113.

The bidirectional converter circuits are configured to convert alternating current to and from direct current. In the present embodiment, the direct current output of the converter circuits is provided to a switching arrangement 205 for connection to a two-channel aircraft dc network, comprising a first dc bus 206 and a second dc bus 207.

In the present example, the switching circuit is operable to connect or disconnect the bidirectional converters to each other, and the dc busses. In this way, various faults may be managed as will be described further with reference to FIG. 5, whilst maintaining the capability to transfer power between the gas turbine spools.

Figure 3:
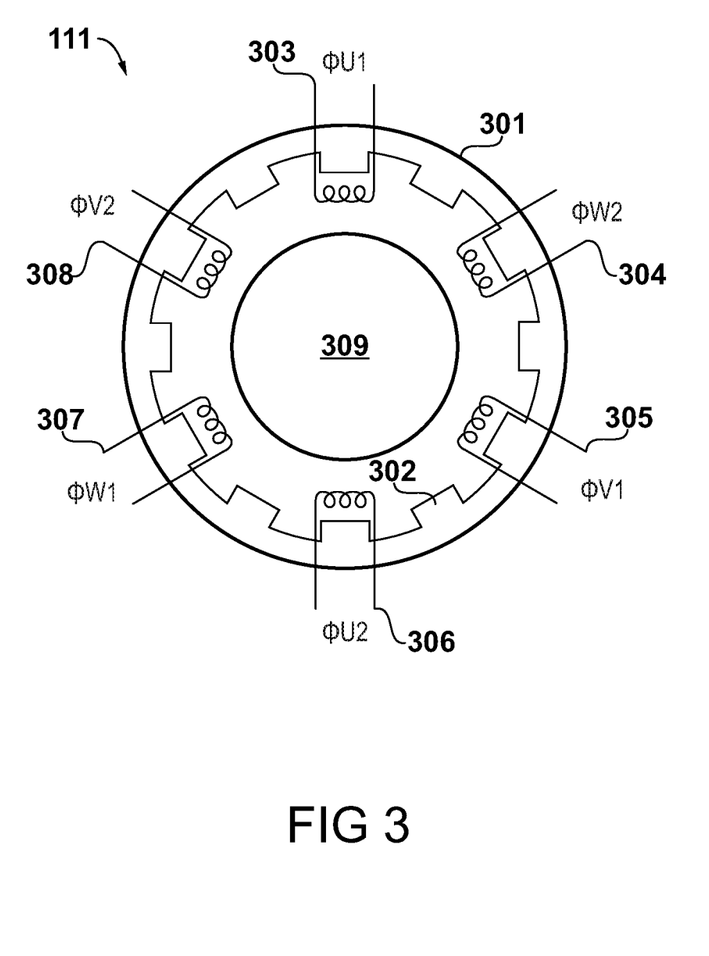
FIG. 3 is a schematic of the dual-wound electric machines of FIG. 1.

FIG. 3

The first electric machine 111 is shown in FIG. 3. In the present embodiment, the configuration—so far as described herein—of the second electric machine 113 is the same.

The first electric machine 111 is a dual-wound rotary electric machine. The term "dual-wound" will be understood by those skilled in the art to mean that it may be considered to comprise two functionally separate submachines. Further, in the present implementation, these submachines are three-phase submachines. It will be appreciated that the number of phases could differ, and in particular may be greater than two. The maximum number is typically limited by space constraints, and would normally be less than nine.

As shown in the Figure, in the present embodiment the first electric machine 111 comprises a stator 301 having twelve teeth 302. Six coils 303, 304, 305, 306, 307, and 308 are wound on alternate teeth such that there is only one coil side per slot. This will be recognised by those skilled in the art as a concentrated winding arrangement. In this way, the coils are electrically, electromagnetically, thermally, and mechanically separated to provide fault-tolerance. In the present embodiment, the "dual-winding" of the first electric machine 111 is achieved by designating opposite coils as part of separate submachines. Thus, coil 303 forms a phase $\phi$U1, and coil 306 forms a phase $\phi$U2. A similar configuration is adopted for the other coils. Phases $\phi$U1, $\phi$V1, and $\phi$W1 which form a first submachine are in the present embodiment connected in a star winding (also known as a wye winding), as are—in a separate connection—phases $\phi$U2, $\phi$V2 and $\phi$W2 which form the second submachine. It will be appreciated that a delta winding may be used instead.

In the present embodiment, the first electric machine 111 is a permanent magnet electric machine. Thus, in operation as a motor, magnetic fields generated by the coils 303 to 308 interact with permanent magnets on a rotor 309 which generates torque. In operation as a generator, the magnetic field of the rotor 309 interacts with the coils 303 to 308 to generate a voltage.

It will be appreciated that a different machine types may be used. For example, a distributed winding scheme could be used. Also, machines of induction, wound-field or switched-reluctance type may be used. Further, the machines may instead be of transverse- or axial-flux configuration.

It is also contemplated that in alternative embodiments the submachines may be formed not by different winding sets wound around the same stator 301, but by axially separate machines each having one of the two windings of the dual winding. Alternatively, the machines may be of radially-segmented stator type in which each submachine occupies a different sector of the stator.

Figure 4A:
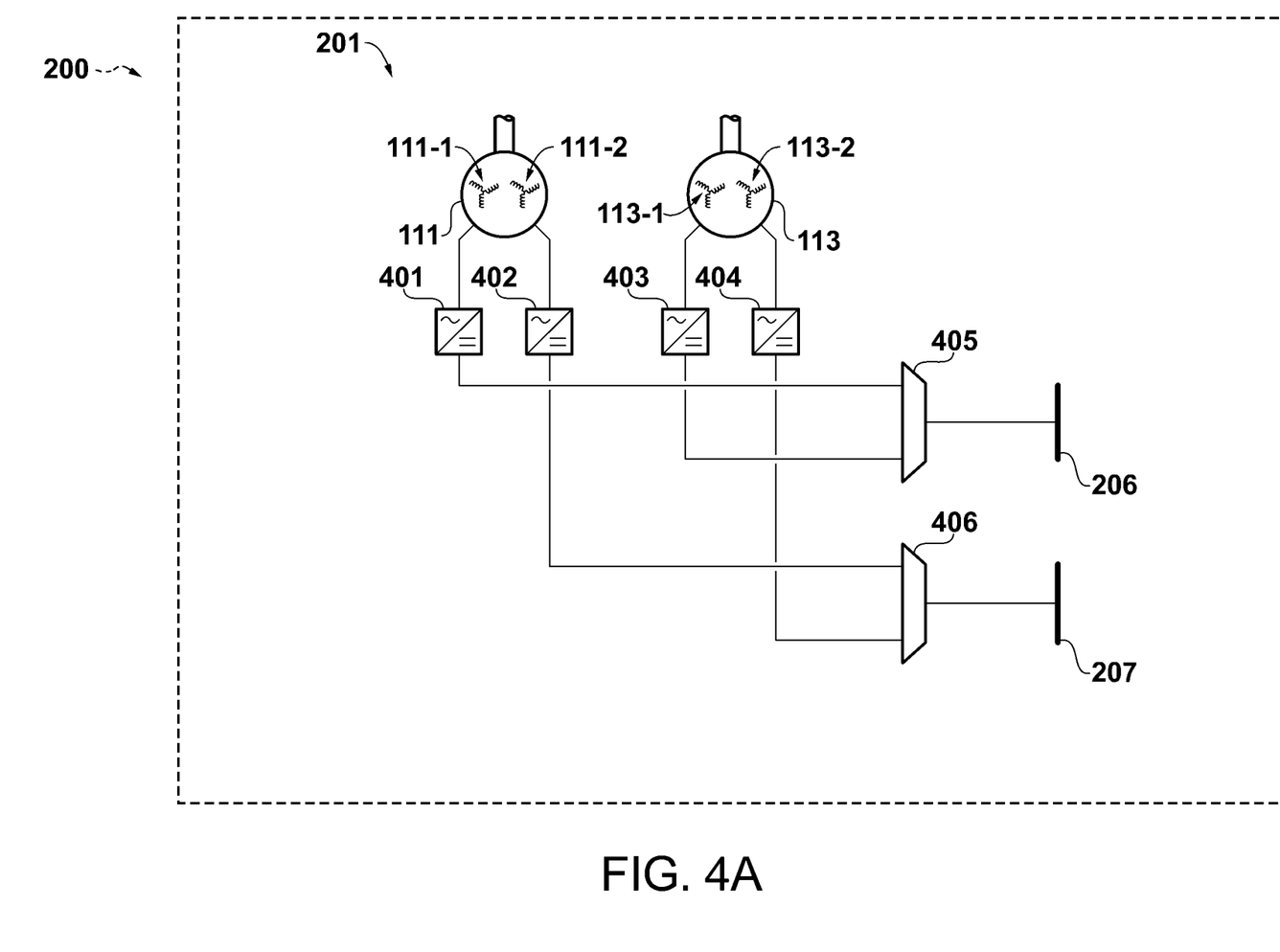
FIGS. 4A and 4B are is a single line diagrams of an embodiment of the electrical system of FIG. 2.
Figure 4B:
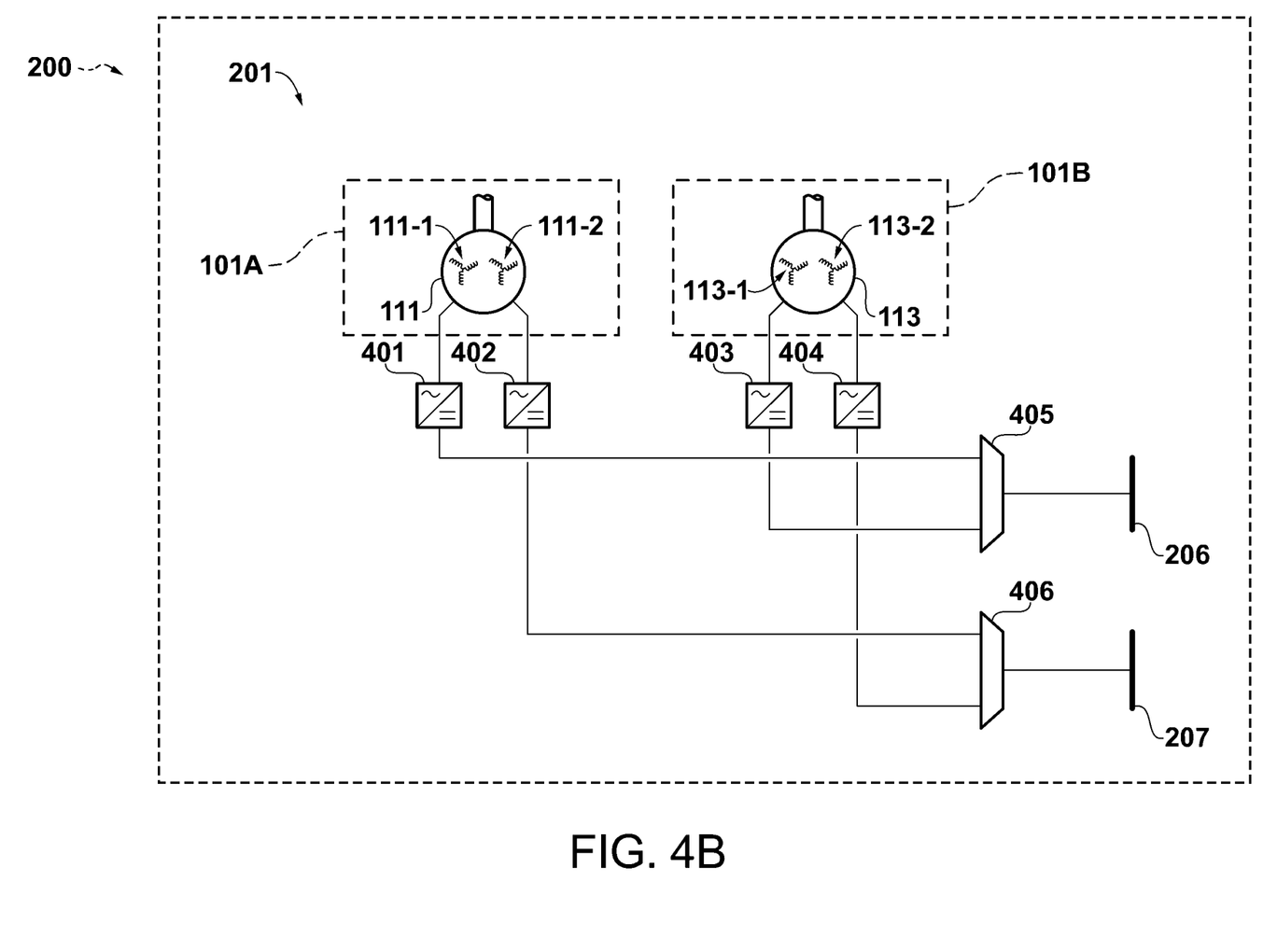

FIGS. 4A and 4B

The electrical system 201 of an exemplary aircraft 200 is shown in more detail in FIGS. 4A and 4B, again in the form of a single line diagram.

Each electric machine 111 and 113 has a three-phase connection for each of the submachines to a respective bidirectional converter circuit. The electric machines have spools each forming part of a same engine, as shown in FIG.

4A, or of different engines 101A and 101B, as shown in FIG. 4B. Thus, a first submachine 111-1 in the first electric machine 111 (corresponding to phases φU1, φV1, and φW1 thereof) is connected with a first bidirectional converter circuit 401. A second submachine 111-2 in the first electric machine 111 (corresponding to phases φU2, φV2, and φW2 thereof) is connected with a second bidirectional converter circuit 402.

Similarly, a third submachine 113-1 in the second electric machine 113 (corresponding to phases φU1, φV1, and φW1 thereof) is connected with a third bidirectional converter circuit 403. A fourth submachine 113-2 in the second electric machine 113 (corresponding to phases φU2, φV2, and φW2 thereof) is connected with a fourth bidirectional converter circuit 404.

Put more concisely, the electrical system comprises N=4 bidirectional converter circuits, each of which has an associated index n=(1, . . . , N), and for all n, the ac side of the nth bidirectional converter circuit is connected with the nth three-phase sub-machine.

In the present embodiment, the bidirectional converter circuits 401 to 404 are two-level converters comprising three half-bridge converter legs along with appropriate filters. However, it will be appreciated that other converter topologies may be used, such as neutral-point clamped topologies.

In the present example, the functionality of switching arrangement 205 is split into two separate switch arrays 405 and 406 which facilitates fault tolerant isolation of the first submachines and the second submachines. Thus, the dc sides of the first and third bidirectional converter circuits 401 and 403 are connected together by a first switch array 405, whilst the dc sides of the first and third bidirectional converter circuits 401 and 403 are connected together by a second switch array 406.

In the present embodiment, the first switch array 405 connects to the dc sides of the first and third bidirectional converter circuits 401 and 403 to the first dc bus 206, whilst the second switch array 406 connects to the dc sides of the second and fourth bidirectional converter circuits 402 and 404 to the second dc bus 207.

In this way, due to the electrical, electromagnetic, thermal and mechanical isolation of the submachines in the first electric machine 111 and the second electric machine 113 combined with the separation of the switch arrays 405, 406 and dc busses 206, 207, a fault on one submachine cannot affect the other.

Figure 5:
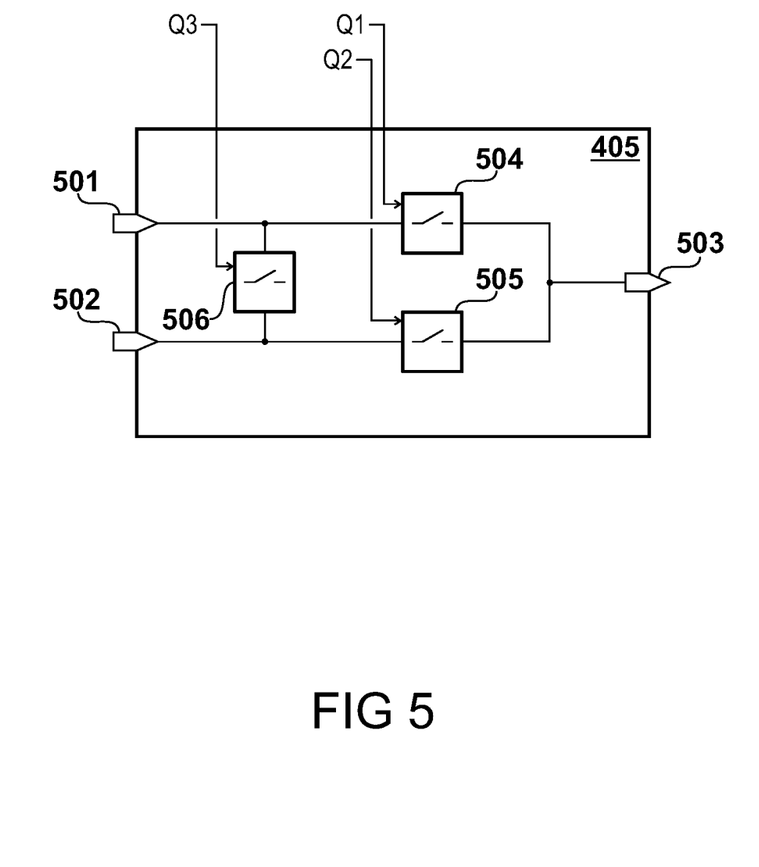
FIG. 5 is a single line diagram of one of the switching arrays of FIGS. 4A and 4B.

FIG. 5

The first switch array 405 is shown in greater detail in FIG. 5, again in the form of a single line diagram. In the present example, the second switch array 406 is of the same configuration.

The switch array 405 comprises a first input 501 for connection with one of the converter circuits, a second input 502 for connection with another one of the converter circuits, and an output 503 for connection with a dc output bus. In the present example, the first input 501 is connected with the first bidirectional converter circuit 401, and the second input 502 is connected with the third bidirectional converter circuit 403. The output 503 is connected with the first dc bus 206. Both the first input 501 and the second input 502 are connected to the output 503.

It will be appreciated that for the second switch array 406, which in this example is of the same configuration, its first input 501 is connected with the second bidirectional converter circuit 402, its second input 502 is connected with the fourth bidirectional converter circuit 404, and its output 503 is connected with the second dc bus 207.

Referring again to FIG. 5, in order to facilitate connection and disconnection of inputs and output, a first switch 504 is provided between the first input 501 and the output 503, a second switch 505 is provided between the second input 502 and the output 503, and a third switch 506 is provided in a bus tie across the first input 501 and second input 502.

One advantage of this arrangement is that each switch 504 to 506 may be configured with the same voltage and current rating, and thus may be provided as identical parts.

In a specific embodiment, the switches 504 to 506 are dc contactors, which as will be familiar to those skilled in the art are electrically-controlled switches used for switching an electrical power circuit, where the control circuit has a lower power level than the switched circuit. This is advantageous as in the contemplated implementations of the electrical system 201, the power levels may be in excess of 500 kilowatts at 540 volts dc.

In the present embodiment, the switches 504 to 506 operate under the control of controller 201, which provides respective control signals Q1, Q2, and Q3 to the switches. In this way, it is possible to isolate any one of the inputs and output during a fault condition and to continue to operate the rest of the electrical system 201.

In operation, there are four possible states with associated switching states for the first switch array 405: one no-fault condition and three fault conditions. The fault may be any type of fault which risks the safe operation of the system, for example a short circuit or an earth fault. Such faults may be sensed by the controller 201 on the basis of a measurement of any of current flow or voltage of each phase. For example, the fault may be sensed using one or more of overcurrent protection, ground (earth) fault protection, unit (or differential) protection and negative phase sequence protection. The fault may be sensed by one or more of a current transformer and a voltage transformer, or digital equivalents.

The primary mode of operation is the no-fault condition. The first fault condition is the existence of a fault between the first submachine 111-1 in the first electric machine 111 and the first bidirectional converter circuit 401. The second fault condition is the existence of a fault between the third submachine 113-1 in the second electric machine 113 and the third bidirectional converter circuit 403. The third fault condition is the existence of a fault on the first dc bus 206.

Control signals Qn associated with these fault conditions are set out in Table 1 below, in which a "0" indicates an open switch, and a "1" indicates a closed switch:

TABLE 1

| Fault Condition | Q1 | Q2 | Q3 |
|---|---|---|---|
| No-fault | 1 | 1 | 0 |
| First | 0 | 1 | 0 |
| Second | 1 | 0 | 0 |
| Third | 0 | 0 | 1 |

Thus, in the no-fault condition the first switch 504 and the second switch 505 are closed, whilst the third switch 506 in the bus tie across the first input 501 and the second input 502 is open. In this way, current flows as normal between the bidirectional converter circuits 401 and 403 and the first dc bus 206.

For each of the other fault conditions as defined previously, the switches 504 to 506 are configured to isolate the faulted part of the electrical system 201 from the remaining, operational parts. Power transfer between the gas turbine spools is possible even in the presence of a fault on the first dc bus 206 by provision of switch 506 in the bus tie across the first input 501 and second input 502, which is closed by the controller in the third fault condition.

It will be appreciated that the configuration and the control of the second switch array 406 is the same. Thus, the primary mode of operation is the no-fault condition. The first fault condition is the existence of a fault between the second submachine 111-2 in the first electric machine 111 and the second bidirectional converter circuit 402. The second fault condition is the existence of a fault between the fourth submachine 113-2 in the second electric machine 113 and the fourth bidirectional converter circuit 404. The third fault condition is the existence of a fault on the second dc bus 206.

In this way, power transfer between gas turbine spools may be facilitated even in the event of multiple faults, for example a fault between the first dc bus 206 and a fault between the second submachine 111-2 and the second bidirectional converter circuit 402.

As described previously, whilst the present embodiments have been described in the context of transferring power between spools within a gas turbine engine, it will be appreciated by those skilled in the art that the principles of the invention may be applied to arrangements comprising two separate gas turbine engines, each with a respective spool.

Furthermore, it is contemplated that the electrical system configuration described herein may be extended to facilitate connection of rotary electric machines with other types of rotating machinery. For example, the rotary electric machines may be connected with other types of heat engines, for example internal combustion engines such as reciprocating or Wankel-type engines. Other types of heat engines such as steam turbines operating according to the Rankine cycle may be connected. Combinations of different types of rotating machinery may be connected.

Thus it will be appreciated that the invention described herein may be expressed as an electrical system for connecting rotary electric machines with other rotating machines, the system having the properties and attributes heretofore described.

It should also be noted that whilst the present embodiments have been described with reference to a turbofan engine 101 for an aircraft, it will be understood that the principles of the described electrical systems may be applied to other installations, for example in a marine environment such as on a naval vessel powered by gas turbines, or in an energy production environment such as in a power station utilising natural gas fired gas turbines, or any other suitable application. Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. An electrical system for connecting rotary electric machines with gas turbine spools, further comprising:
   a first dual-wound rotary electric machine mechanically coupled with a first gas turbine spool and comprising a first three-phase sub-machine and a second three-phase submachine electrically independent from the first three-phase submachine;
   a second dual-wound rotary electric machine mechanically coupled with a second gas turbine spool and comprising a third three-phase sub-machine and a fourth three-phase submachine electrically independent from the third three-phase submachine, the first dual-wound rotary electric machine being separately provided from the second dual-wound rotary electric machine; and
   a set of N=4 bidirectional converter circuits for conversion of alternating current (ac) to and from direct current (dc), each of which has an associated index n=(1, . . . , N), and for all n, the ac side of the nth bidirectional converter circuit is connected with the nth three-phase sub-machine,
   wherein the dc side of a first bidirectional converter circuit and the dc side of a third bidirectional converter circuit are connected with each other and to a first dc output bus via a first switch array,
   wherein the dc side of a second bidirectional converter circuit and the dc side of a fourth bidirectional converter circuit are connected with each other and to a second dc output bus via a second switch array, and
   wherein a fault in one of the first and second three-phase submachines cannot affect the other of the first and second three-phase submachines, and a fault in one of the third and fourth three-phase submachines cannot affect the other of the third and fourth three-phase submachines.

2. The electrical system of claim 1, wherein the first switch array and the second switch array each comprise:
   a first input connected with one of the bidirectional converter circuits;
   a second input connected with another one of the bidirectional converter circuits;
   an output connected with one of the dc output busses;
   a first switch between the first input and the output;
   a second switch between the second input and the output;
   a bus tie across the first input and the second input, the bus tie comprising a third switch.

3. The electrical system of claim 2, wherein the first switch array and the second switch array are configured to operate in a no-fault condition in which the first switch and the second switch are closed, and the third switch is opened.

4. The electrical system of claim 2, wherein the first switch array and the second switch array are configured to operate in a first fault condition in which the second switch is closed, and the first switch and the third switch are opened.

5. The electrical system of claim 4, further comprising a control circuit configured to:
   operate the first switch array in the first fault condition in response to identification of a fault between the first three-phase submachine and the first bidirectional converter circuit; and
   operate the second switch array in the first fault condition in response to identification of a fault between the second three-phase submachine and the second bidirectional converter circuit.

6. The electrical system of claim 2, wherein the first switch array and the second switch array are configured to operate in a second fault condition in which the first switch is closed, and the second switch and the third switch are opened.

7. The electrical system of claim 6, further comprising a control circuit configured to:
   operate the first switch array in the second fault condition in response to identification of a fault between the third three-phase submachine and the third bidirectional converter circuit; and
   operate the second switch array in the second fault condition in response to identification of a fault between the fourth three-phase submachine and the fourth bidirectional converter circuit.

8. The electrical system of claim 2, wherein the first switch array and the second switch array are configured to operate in a third fault condition in which the third switch is closed, and the first switch and the second switch are opened.

9. The electrical system of claim 8, further comprising a control circuit configured to:
operate the first switch array in the third fault condition in response to identification of a fault between the output of the first switch array and the first dc output bus; and
operate the second switch array in the third fault condition in response to identification of a fault between the output of the second switch array and the second dc output bus.

10. The electrical system of claim 2, wherein the switches are dc contactors.

11. The electrical system of claim 2, wherein the first switch is located directly between the second input and the output.

12. A gas turbine engine having a low-pressure spool and a high-pressure spool, and further comprising the electrical system of claim 1, wherein the first gas turbine spool is the low-pressure spool and the second gas turbine spool is the high-pressure spool.

13. An aircraft comprising the gas turbine of claim 12.

14. An arrangement comprising:
a first gas turbine engine having a first spool;
a second gas turbine engine different from the first gas turbine engine, and having a second spool; and
the electrical system of claim 1, in which the first gas turbine spool is the first spool of the first gas turbine engine, and the second gas turbine spool is the second spool of the second gas turbine engine.

15. An aircraft comprising the arrangement of claim 14.

* * * * *